United States Patent [19]

Maeng

[11] Patent Number: 5,636,198
[45] Date of Patent: Jun. 3, 1997

[54] MULTI-COMPACT DISK PLAYER

[75] Inventor: Hyun J. Maeng, Kyunggi-do, Rep. of Korea

[73] Assignee: Goldstar Alps Co., Ltd., Kyungsannam-do, Rep. of Korea

[21] Appl. No.: 246,807

[22] Filed: May 20, 1994

[30] Foreign Application Priority Data

May 20, 1993 [KR] Rep. of Korea .................... 93-8682

[51] Int. Cl.⁶ ........................... G11B 17/04; G11B 33/02
[52] U.S. Cl. ................................... 369/191; 369/771
[58] Field of Search ........................ 369/75.1, 75.2, 369/77.1, 77.2, 191, 247, 263

[56] References Cited

U.S. PATENT DOCUMENTS

| | | | |
|---|---|---|---|
| 5,063,557 | 11/1991 | Takamatsu et al. | 369/219 |
| 5,142,522 | 8/1992 | Muramatsu et al. | 369/75.2 |
| 5,163,038 | 11/1992 | Arai | 369/77.2 |
| 5,172,361 | 12/1992 | Urushibata et al. | 369/270 |
| 5,280,463 | 1/1994 | Okajima et al. | 369/75.1 |

*Primary Examiner*—Stuart S. Levy
*Assistant Examiner*—David D. Davis
*Attorney, Agent, or Firm*—Helfgott & Karas, P.C.

[57] ABSTRACT

A multi-compact disk player adapted to be mounted on vehicles is provided, in which locking, clamping and tray loading can be performed in parallel by a pickup motor for loading a pickup. This multi-compact disk player comprises a locking portion for preventing a pickup base from vibrating while a selected disk is inserted into the player, a clamping portion for clamping the inserted disk under the locked state of the pickup base, a tray transfer portion for inserting a tray into the player under the clamped state of the disk, a pickup transfer portion for conveying a pickup onto the disk after the disk is inserted into the player, and a single drive motor for driving the locking portion, the clamping portion, the tray transfer portion and the pickup transfer portion by interlocking them with each other.

1 Claim, 6 Drawing Sheets

MULTI-COMPACT DISK PLAYER

BACKGROUND OF THE INVENTION

This invention relates, generally, to a multi-compact disk player, and, more particularly, to a multi-compact disk player in which clamping, locking and tray loading can all be performed by driving a pickup motor for loading a pickup.

Figure 1:
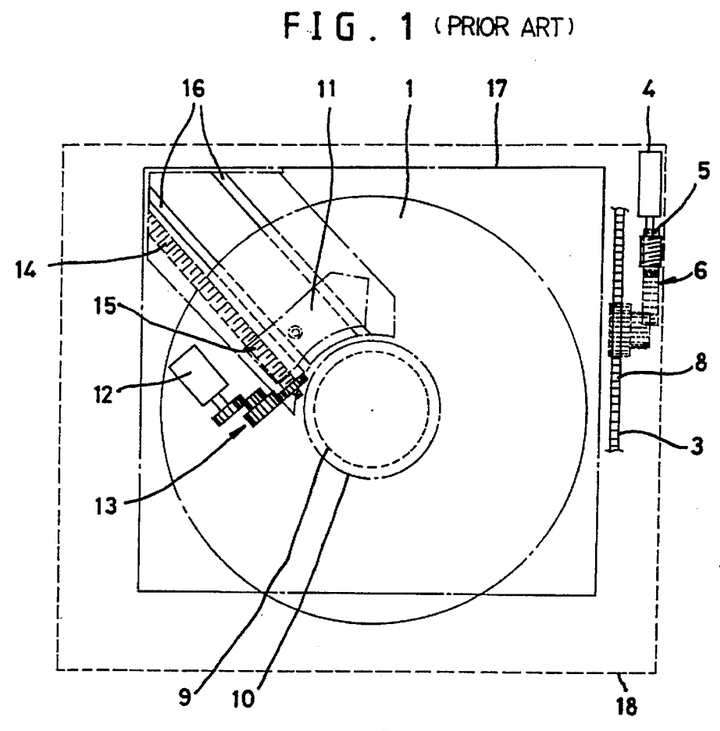
FIG. 1 is a plan view of conventional multi-compact disk player.
Figure 2:
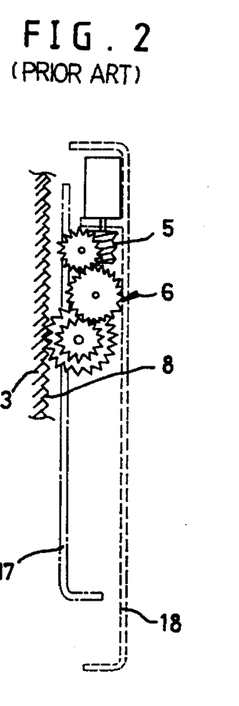
FIG. 2 is a side view of conventional multi-compact disk player.

As shown in FIGS. 1 to 5, a conventional multi-compact disk player comprises a magazine 2 for receiving a plural sheet of disk 1, a tray 3 for mounting the magazine 2, a drive motor 4 for driving the tray 3, a worm 5 mounted on an axis of the drive motor 4, a group of gears 6 toothed with the worm 5 for changing rotational speed of the drive motor 4, a rack 8 toothed with the group of gears 6 and formed with the tray 3 for moving the tray 3 horizontally, a turntable 9 for mounting and rotating any one selected out of the disks of the magazine 2, a spindle motor 9' for driving the turntable 9, a clamper 10 for clamping the disk 1 mounted on the turntable 9, a pickup 11 for transmitting and receiving optical signals of the disk 1 clamped by the clamper 10, a drive motor 12 for driving the pickup 11, a group of gears 13 for changing rotational speed of the drive motor 12, a lead screw 14 being rotated variably by the group of gears 13, a mold screw 15 for moving the pickup 11 by being engaged with the lead screw 14, and a pickup base 17 including pickup transfer means having a guide rod 16 for guiding the movement of the pickup 11. In FIG. 2, a reference numeral 18 designates a main base.

Figure 3:
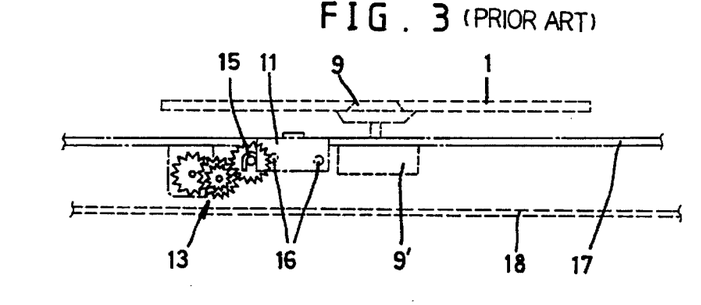
FIG. 3 is a front view of conventional multi-compact disk player.
Figure 4:
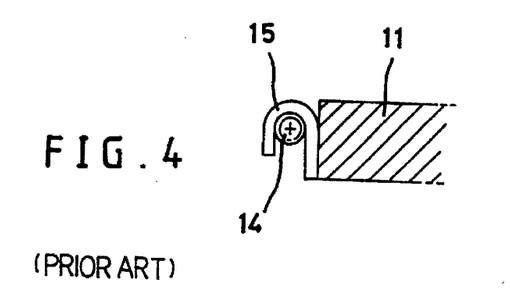
FIG. 4 is a expanded sectional view of a pickup transfer device according to the conventional multi-compact disk player of FIG. 3.
Figure 5A:
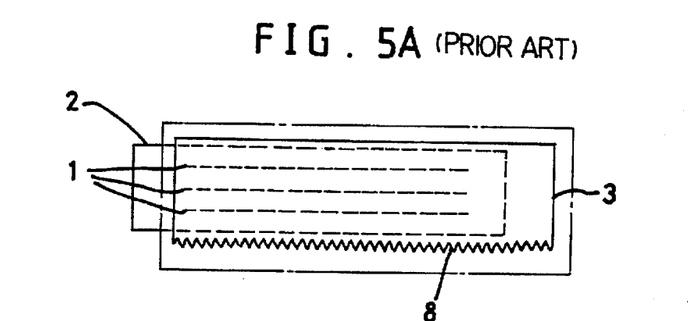
FIG. 5A shows the inserted state of the tray into the player.
Figure 5B:
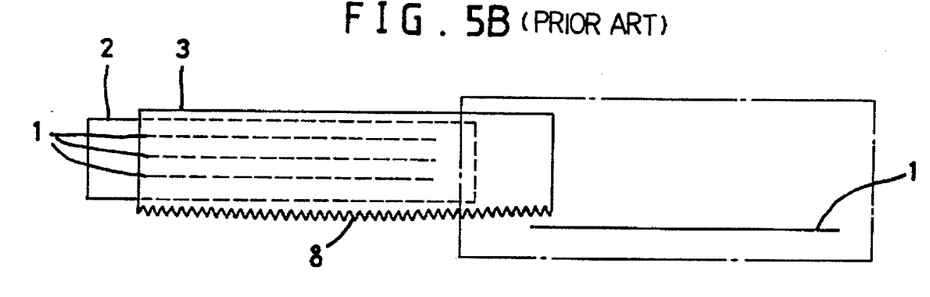
FIG. 5B shows the drawn state of the tray out of the player for selecting a disk and FIG. 5C shows the clamped state of the tray inserted into the player.
Figure 5C:
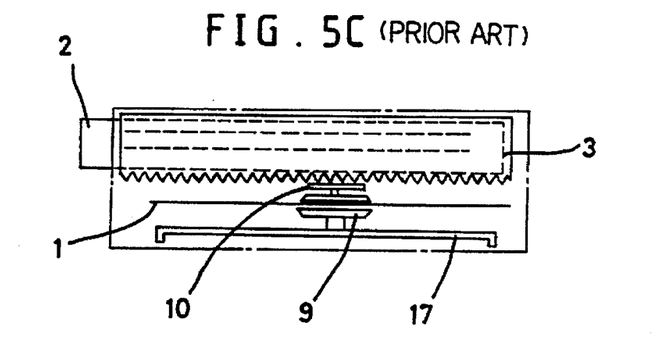

To operate the player having the above construction, at first, the magazine receiving the disks 1 is mounted on the tray 3, and then the tray 3 mounting the magazine 2 is opened in order to select and load a desired disk 1. Under the opened condition of the tray 3, after a desired disk 1 is selected and mounted on the turntable 9, the clamper 10 is driven to clamp the disk 1, and then the clamping (not shown) is completed. That is, this operation is in such a way that on condition that rotational speed of the drive motor 4 is suitably adjusted by the worm 5 and the group of gears 6, the tray 3 is moved and inserted into the player because the last gear of the group of gears 6 is engaged with the rack 8 formed with the tray 3.

As described above, if the disk 1 is mounted on the turntable 9 and the clamper 10 completes its clamping action, the turntable 9 is rotated by the spindle motor 9' and simultaneously the pickup is moved. That is, if the drive motor 12 is operated in response to a certain signal, the rotational speed of the drive motor 12 is varied by the group of gear 13 and the lead screw 14 is rotated by the speed-varied rotational force, so that the pickup 7 having the mold screw 15 engaged with the lead screw 14 is moved according to the rotational direction of the lead screw 14 and performs sound reproduction by transmitting and receiving optical signals.

Since the conventional device has the tray drive motor for loading the tray and the pickup drive motor for loading the pickup, separately, it requires control systems for driving both motors, respectively, thereby increasing the cost of production. Also, it has a disadvantage that backlash is relatively large due to the moving mechanism of the tray.

SUMMARY OF THE INVENTION

Considering the above-mentioned problems, the main object of the present invention is to provide a multi-compact disk player in which locking of pickup during insertion of a selected disk into the player, clamping of disk, loading of tray and moving of pickup are performed all together by a single drive motor, thereby reducing the number of components and the cost of production.

Another object of the present invention is to provide a multi-compact disk player being adapted to be mounted on vehicles and having a compact construction.

To achieve these objects, the present invention provides a multi-compact disk player having a main base, a tray and an optical pickup, said player comprising: a pickup base being formed separate from a main base and providing damping of external impact or vibration when connected with the main base; locking means for preventing the pickup base from vibrating while a selected disk is inserted into the player; clamping means for clamping the inserted disk under the locked state of the pickup base; tray transfer means for inserting the tray into the player under the clamped state of the disk; pickup transfer means for conveying the pickup onto the disk after the tray is inserted into the player; and a single drive motor for driving the locking means, the clamping means, the tray transfer means and the pickup transfer means by interlocking them with each other.

Also, the pickup base comprises a connecting projection able to be connected with a fixed projection formed with the main base, an interconnecting pin for interconnecting the connecting projection and the fixed projection, and elastic members for damping external impact or vibration when the pickup base is connected with the main base.

Also, the locking means comprises a rotating worm mounted on an axis of the drive motor, a gear being rotated in tooth with 5 the worm, a cam gear mounted on an axis of the gear and able to be rotated synchronizingly with the gear, a locking lever for locking and unlocking the pickup base by its forward and backward movements due to the rotation of the cam gear, locking lever transfer means for moving the locking lever forward and backward according to the rotation of the cam gear by being interlocked with the cam gear, horizontal vibro-isolating means for preventing the pickup base from vibrating horizontally due to the mobility of the locking lever, and vertical vibro-isolating means for preventing the pickup base from vibrating vertically due to the mobility of the locking lever.

Also, the clamping means comprises a separate cam gear being rotated synchronizingly with the gear which is engaged with the worm mounted on the axis of the drive motor, a clamping lever for clamping and unclamping the disk by its forward and backward movements due to the rotation of the cam gear, transfer means for moving the clamping lever forward and backward according to the rotation of the cam gear by being interlocked with the cam gear, guide means for guiding the movements of the clamping lever due to the drive of the transfer means, and vertical operating means for clamping the disk by the movements of the clamping lever due to the drive of the transfer means. In this case, the motor is driven to clamp the disk inserted into the player under the locked state.

Also, the tray transfer means comprises a change gear for changing rotational speed by being toothed with a gear part of the cam gear which actuates the locking means by the drive of the drive motor, and a rack for moving the tray linearly by being engaged with the change gear.

Also, the pickup transfer means comprises a gear being rotated in tooth with a gear part of the cam gear which actuates the clamping means by the drive of the drive gear, a rack for moving the pickup linearly by being engaged with the gear, and a guide rod for guiding the movement of the pickup by being inserted into a guide hole formed with the pickup according to the movement of the rack.

BRIEF DESCRIPTION OF THE DRAWINGS

The above objects, features and advantages of the present invention will become more apparent by the following description with reference to the attached drawings, in which:

FIG. 5A, 5B and 5C are views showing the moving states of a tray according to the conventional multi-compact disk player, where

FIG. 8A, 8B, 8C and 8D are views showing locking means of the multi-compact disk player according to the present invention, where

FIG. 9A, 9B and 9C are views showing clamping means of the multi-compact disk player according to the present invention, where

DETAILED DESCRIPTION OF THE INVENTION

Figure 6:
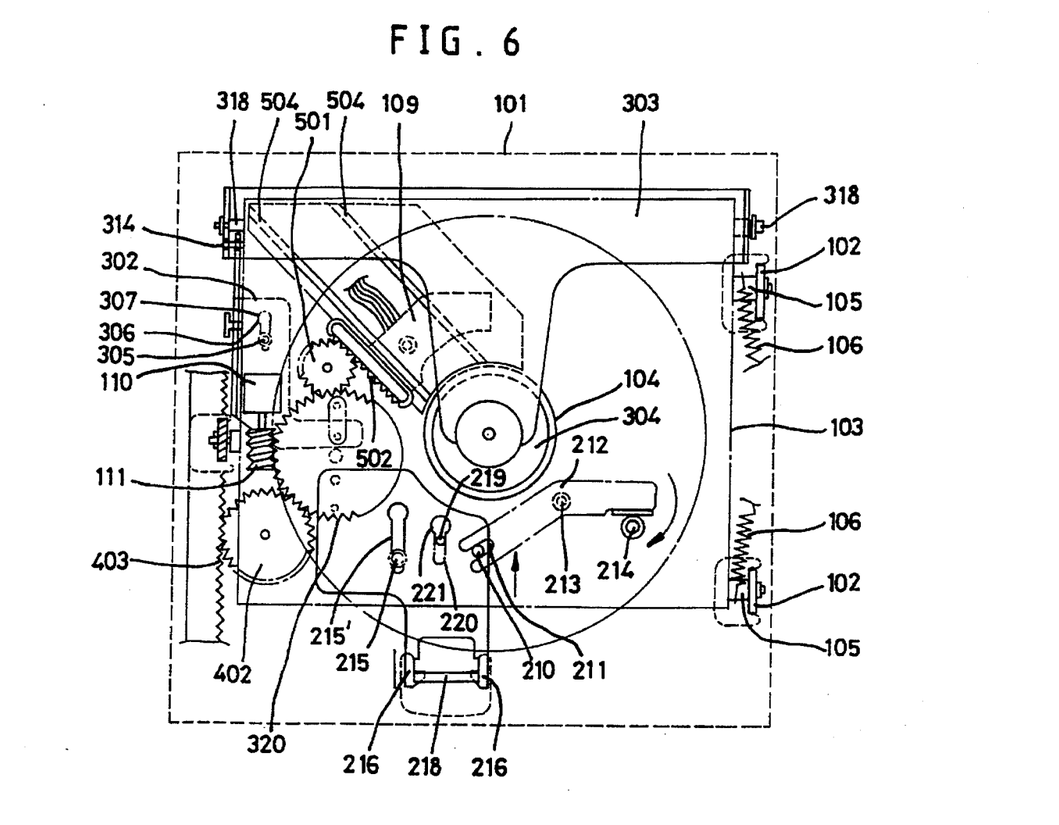
FIG. 6 is a plan view of the multi-compact disk player according to the present invention.
Figure 7:
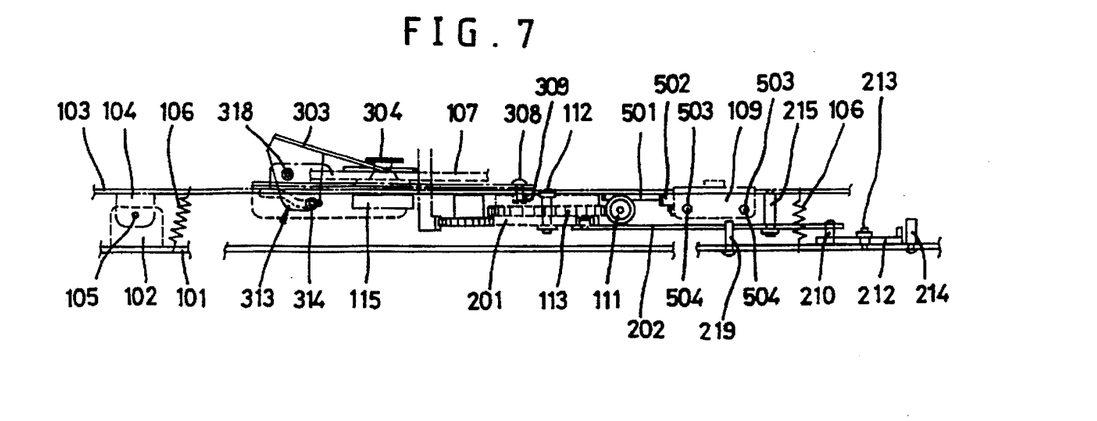
FIG. 7 is a side view of the multi-compact disk player according to the present invention.

Referring to FIGS. 6 and 7, a pickup base 103 according to the present invention comprises a connecting projection 104 able to be connected with a fixed projection 102 formed with a main base 101, an interconnecting pin 105 for interconnecting the connecting projection 104 and the fixed projection 102, and elastic members 106 for damping external impact or vibration acting on the pickup base 103 when connected with the main base 101, so that the pickup base 103 is stably connected with the main base 101.

Describing the present invention in detail, a multi-compact disk player according to the present invention comprises a locking portion for preventing the pickup base 103 from vibrating while a selected disk 107 is inserted into the player, a clamp portion for clamping the inserted disk 107 under the locked state of the pickup base 103, a tray transfer portion for inserting the tray 108 into the player under the clamped state of the disk 107, and a pickup transfer portion for conveying the pickup 109 towards the disk 107 after the tray 108 is inserted into the player by the tray transfer portion.

Also, the multi-compact disk player according to the present invention is constructed so that the locking portion, the clamping portion, the tray transfer portion and the pickup transfer portion are actuated by a single drive motor 110.

Referring to FIG. 8, the locking portion comprises a rotating worm 111 mounted on an axis of the drive motor 110, a gear 113 being rotated in tooth with the worm 111, a cam gear 201 mounted on an axis 112 of the gear 113 and able to be rotated synchronizingly with the gear 113, a locking lever 202 for locking and unlocking the pickup base 103 by its forward and backward movements due to the rotation of the cam gear 201, a locking lever transfer portion for moving the locking lever 202 forward and backward according to the rotation of the cam gear 201 by being interlocked with the cam gear 201, and horizontal and vertical vibro-isolating portions for preventing the pickup base 103 from vibrating horizontally and vertically due to mobility of the locking lever 202, respectively.

Figure 8A:
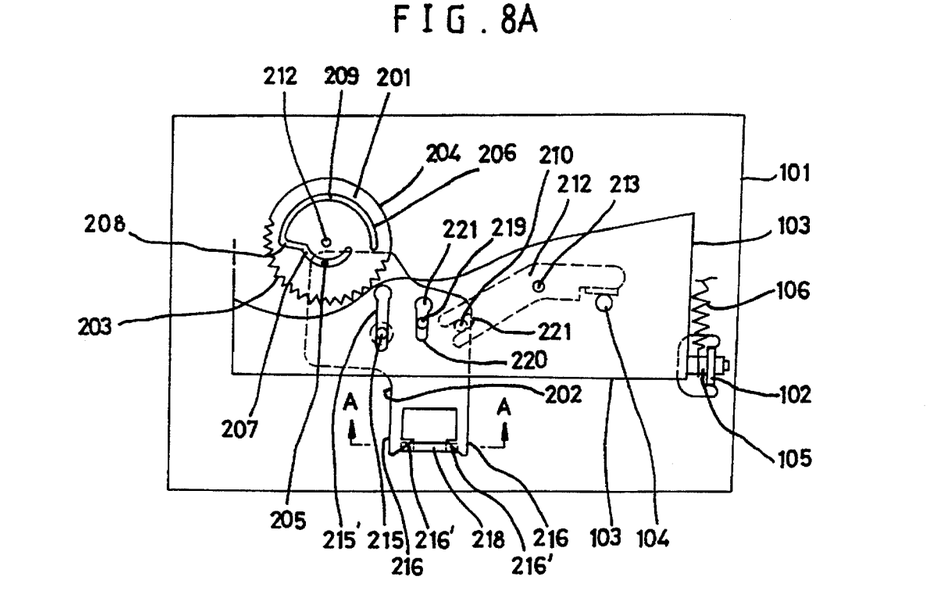
FIG. 8A is a plan view showing the locked state.
Figure 8B:
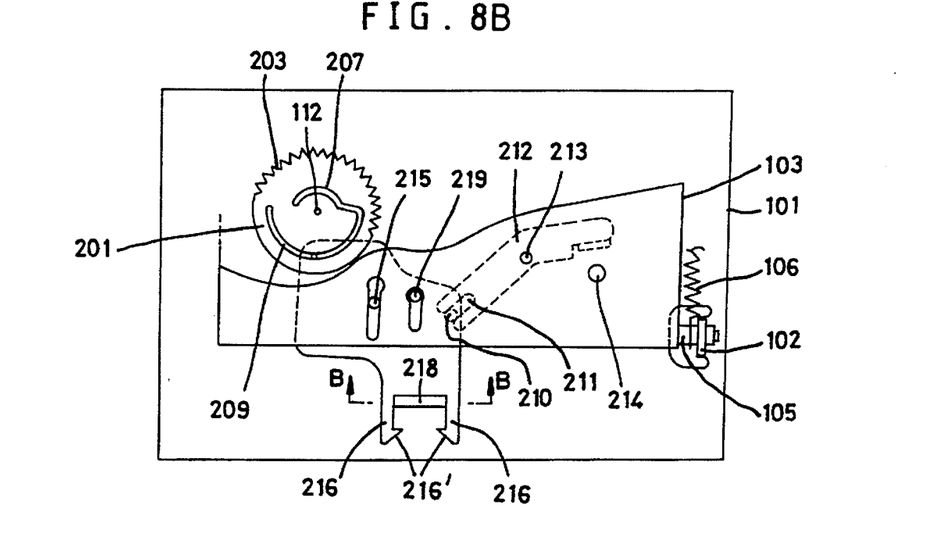
FIG. 8B is a plan view showing the unlocked state.

The cam gear 201 comprises a gear part for actuating the tray transfer portion by being interlocked with a change gear 402 of the tray transfer portion and a non-gear part for idling the cam gear 201 after the tray 108 is inserted into the player by the rotation of the gear part 203, so that the tray 108 starts to be moved by the rotation of the gear part of the cam gear 201 and the movement of the tray 108 is stopped after the cam gear 201 is further rotated over a certain angle.

The locking lever transfer portion comprises a pin 205 formed with the locking lever 202 and a guide slot 206 formed with the cam gear 201 for inserting and guiding the pin 205 to move the locking lever 202 forwardly and backwardly. The guide slot 206 includes three groove parts 207, 208 and 209 having different radii of curvature with each other. The groove part 207 serves to guide the rotation of the cam gear 201 while maintaining the locked state, the groove part 208 serves to release the locked state into the unlocked state, and the groove part 209 serves to guide the rotation of the cam gear 201 while maintaining the unlocked state, so that the locking and unlocking of the pickup base 103 are performed progressively according to the rotation of the cam gear 201.

The horizontal vibro-isolating portion comprises a projection 210 formed with the locking lever 202, a locker 212 having a insertion groove 211 into which the projection 210 is inserted and being turned by the forward and backward movements of the locking lever 202, an axis 213 formed with the main base 101 as a turning center of the locker 212, a projection 214 formed with the main base 101 for preventing the locker 212 from turning longer by being contacted with one end of the locker 212, and a guide slot 215' formed with the main base 101 for guiding the forward and backward movements and stop action of the projection 215 of the locking lever 202, thereby blocking horizontal vibration by the locker 212.

Figure 8C:
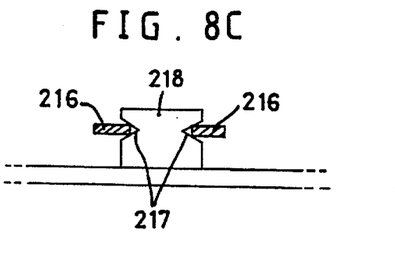
FIG. 8C is a sectional view along the line A—A of FIG. 8A
Figure 8D:
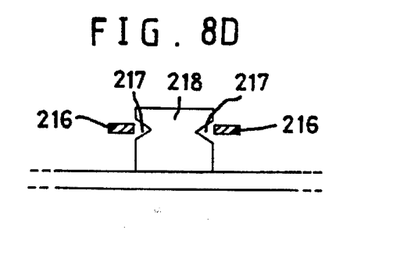
FIG. 8D is a sectional view along the line B—B of FIG. 8B.

The vertical vibro-isolating portion comprises a guide piece 216 formed with the locking lever 202, a support piece 218 formed with the main base 101 for guiding forward and backward movements of the guide piece 216 according to the forward and backward movements of the locking lever 202, a guide groove 217 formed with the support piece 218, and a hook projection 216' formed with the guide piece 216 and hooked into the guide groove 217, thereby blocking vertical vibration by the support piece 218 and the hook projection 216'.

The multi-compact disk player according to the present invention further comprises a guide hole 220 for leading the locked state to the unlocked state. The guide hole 220 is formed with the pickup base 103 and guides a guide projection 219 formed with the locking lever 202, and one end of the guide hole 220 is formed as a guide hole 221 having a diameter greater than that of the guide projection 219 in order to enable the guide projection 219 to vibrate vertically and horizontally under the unlocked state.

Figure 9A:
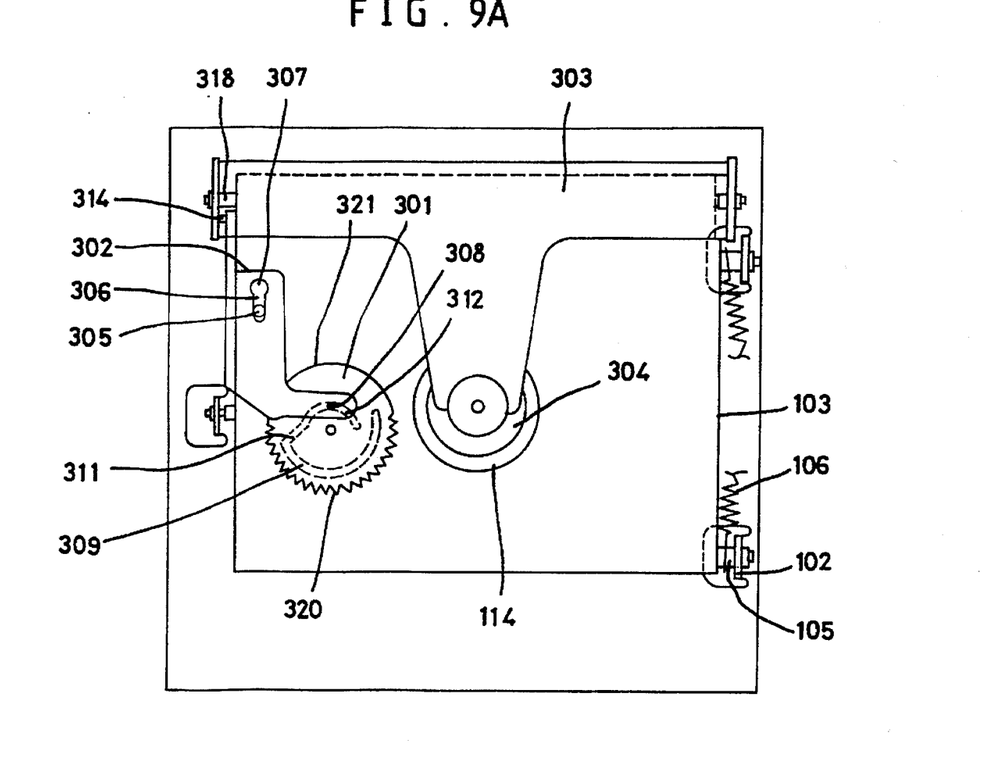
FIG. 9A is a plan view.
Figure 9B:
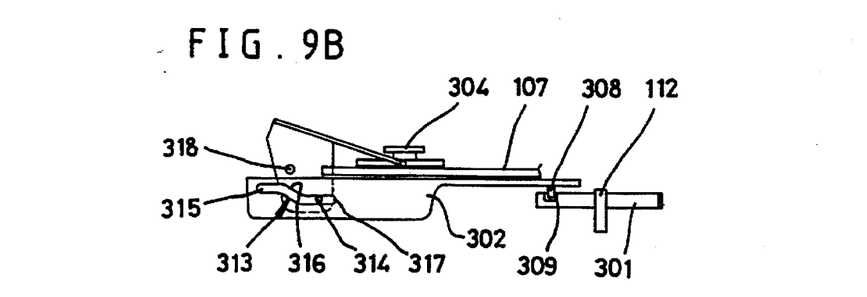
FIG. 9B is a view showing the clamped state and FIG. 9C is a view showing the unclasped state.
Figure 9C:
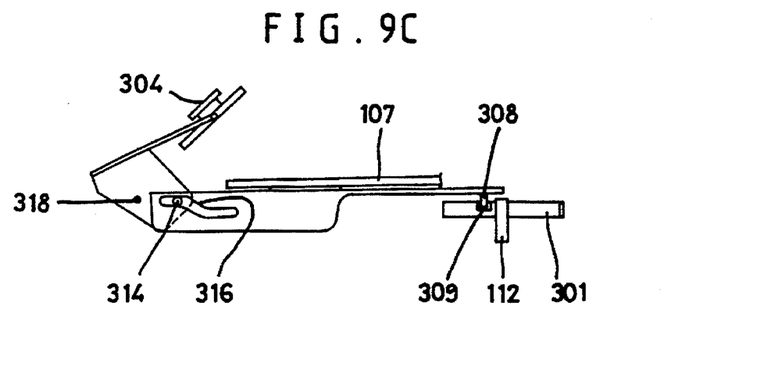

Referring to FIG. 9, the clamping portion comprises a separate cam gear 301 being rotated synchronizingly with the gear 113 which is engaged with the worm 111 mounted on the axis of the drive motor 110, said drive motor 110 being driven to clamp the disk 107 inserted into the player under the locked state, a clamping lever 302 for clamping and unclamping the disk 107 by its forward and backward movements due to the rotation of the cam gear 301, a transfer portion for moving the clamping lever 302 forward and backward according to the rotation of the cam gear 301 by being interlocked with the cam gear 301, a guide portion for guiding the movements of the clamping lever 302 due to the drive of the transfer portion, and vertical operating portion for clamping the disk 107 by the movements of the clamping lever 301.

Furthermore, a guide slot 306 is formed with the pickup base 103 to guide the moving clamping lever 302 in such a way that a guide projection 305 formed with the clamping lever 302 is inserted into the guide slot 306.

One end of the guide slot 306 is formed as a guide hole 307 having a diameter greater than that of the guide projection 305 in order to prevent the guide projection 305 from being contacted with the pickup base 103 in the clamped state.

The transfer portion comprises a pin 308 formed with the clamping lever 302 and a guide slot 309 formed with the cam gear 301 for inserting and guiding the pin 308 to move the clamping lever 302 forward and backward. The guide slot 206 includes three groove parts 310, 311 and 312 having different radii of curvature with each other. The groove part 310 serves to guide the rotation of the cam gear 301 while maintaining the clamped state, the groove part 311 serves to release the clamped state into the unclamped state, and the groove part 312 serves to guide the rotation of the cam gear 301 while maintaining the unclamped state, so that clamping and unclamping of the disk 107 are performed progressively according to the rotation of the cam gear 301.

The vertical operating portion comprises a guide groove 313 formed with the clamping lever 302, a clamping holder 303 having a projection 314 inserted into the guide groove 313 and able to be moved vertically by the horizontal movements of the clamping lever 302, an axis 318 formed with the pickup base 103 and on which the other end of the clamping holder 303 is mounted to enable the leading end of the clamping holder 303 to be moved vertically.

The guide groove 313 includes three parts of grooves 314, 316 and 317. The linear groove 314 permits the clamping lever 302 to be moved forward and backward under lifting of the leading end of the clamping holder 303, that is, under the unclamped state. The inclined groove 316 guides the leading end of the clamping holder 303 to descend from the unclamped position to the clamped position. The linear groove 317 maintains the clamping lever 302 mobile under the clamped state of the clamping holder 303.

As shown in FIGS. 6 and 7, the tray transfer portion comprises a change gear 402 for changing rotational speed by being toothed with a gear part 203 of the cam gear 201 which actuates the locking portion by the drive of the drive motor 110, and a rack 403 for moving the tray 108 linearly by being engaged with the change gear 402.

As also shown in FIGS. 6 and 7, the pickup transfer portion comprises a gear 401 being rotated in tooth with a gear part 320 of the cam gear 301 which is in turn rotated in tooth with the worm 111 mounted on the axis of the drive motor 110, a rack 502 for moving the pickup 119 linearly by being engaged with the gear 401, and a guide rod 504 for guiding the movement of the pickup 119 by being inserted into a guide hole 503 formed with the pickup 119 according to the movement of the rack 502.

The non-mentioned reference numerals 114 and 115 designate a turntable and a spindle motor for driving the turntable 114, respectively.

The operation and the operative effect of the multi-compact disk player having the above construction are described hereinafter with reference to FIGS. 6 to 9.

Considering that the multi-compact disk player according to the present invention is particularly used for vehicles, it must be locked without swinging by external impact while a disk is selected and the selected disk is inserted into the player.

Also, it requires damping function for absorbing the external impact during the play of the multi-compact disk player.

To play the disk player, the tray 108 is drawn outwardly from the player using a well-known device in the art, and then a disk 107 is selected from those of the magazine by a selecting device and inserted into the player.

If devices swing during insertion of the disk 107 into the player, the inserting of the disk 107 is not favorable, therefore, the pickup base having various devices must be fixedly locked.

For locking of the pickup base 103, the drive motor 110 is driven to rotate the worm 111 mounted on the axis of the drive motor 110 and thus the gear 113 is engaged with the worm.

Simultaneously, the cam gear 201 mounted on an axis 112 of the gear 113 is synchronizingly rotated.

Then, the locking lever 202 starts to be moved according to the rotation of the cam gear 201 because the pin 205 of the locking lever 202 is inserted into the guide slot 206.

That is, as shown in FIG. 8B, the drive motor 110 is driven to rotate the gear 113 via the worm 111 mounted on its axis under the unlocked state.

Accordingly, the cam gear 201 mounted on the axis 112 of the gear 113 is rotated synchronizingly with the gear 113, and the pin 205 is guided into the groove part 207 through the groove parts 208 and 209 to move the locking lever 202, as shown in FIG. 8A.

At this time, the guide piece 216 of the locking lever 202 is moved until the hook projection 216' formed with the guide piece 216 is inserted into the guide groove 217 of the support piece 218 formed with the main base 101.

Therefore, the locking lever 202 having the guide piece 216 is fixed in the vertical direction by inserting the hook projection 216' of the guide piece 216 into the guide groove 217 of the support piece 218.

During the above process, the projection 210 formed with the locking lever 202 is inserted into the groove 211 formed with the locker 212, as shown in FIG. 8A, so that the locker 212 is rotated round the axis 213 by the projection 210.

That is, if the locker 212 is rotated round the axis 213 by inserting the projection 210 into the groove 211 of the locker 212 and takes up a certain position, one end of the locker 212 is hooked to the projection 214, thereby the locking lever 202 being fixed in the backward and forward direction.

Therefore, in the above state, the locking lever 202 does not swing in the vertical direction by the support piece 218 formed with the main base 101 and does not swing in the backward and forward direction by the locker 212.

Also, the locking lever 202 is prevented from swinging to the left and right direction by inserting the projection 215 and the guide projection 219 into the guide hole 220 and the guide groove 215', respectively, and then the locked state is completed.

Under the locked state, the drive motor 110 is driven to actuate the clamping portion to start clamping operation after the selected disk 107 is inserted into the player.

That is, under the above locked state, the tray stops its movement because the non-gear part 204 of the cam gear 201 of the locking portion is positioned at the tray transfer portion, and the cam gear 301 mounted on the axis 112 together with the cam gear 201 is ready to actuate the clamping portion.

Under the state of FIG. 9C, the pin 308 inserted into the guide slot 309 of the cam gear 301 is moved forwardly by the rotation of the cam gear 301 and simultaneously the clamping lever 302 is moved forwardly by the pin 308 formed with itself.

Then, the guide projection 305 formed with the clamping lever 302 is guided along the guide slot 306 formed with the pickup base 103.

The forward movement of the clamping lever 302 causes the clamping holder 303 to be guided along the guide groove 313 formed with the clamping lever 302, as shown in FIG. 9A.

That is, the projection 314 of the clamping holder 303 is moved from the position of the linear groove 315 through the position of the inclined groove 316 to the position of the linear groove 317 along the guide groove 313. Describing more concretely, under the state of FIG. 9C, the forward movement of the clamping lever 302 brings the projection 314 of the clamping holder 303 from the position of the linear groove 315 into the position of the inclined groove 316, and then the leading end of the clamping holder 303 is pivoted downwardly round the axis 318 due to the descent of the projection 314 along the inclined groove 316.

Accordingly, a clamper 304 formed with the leading end of the clamping holder 303 presses and clamps the disk 107 lying on the turntable 114 and simultaneously the projection 314 maintains its clamped position by the linear groove 317.

In this initial state of clamping, the cam gear 201 of the locking portion starts to be rotated and finally falls into the state of FIG. 8C at the end of clamping.

During the rotation of the cam gear 201, the pin 205 of the locking lever 202 is guided from the position of the groove part 207 through the position of the groove part 208 to the position of the groove part 209 along the guide slot 206. This means that the locking lever 202 is moved backward.

Therefore, the guide piece 216 formed with the locking lever 202 is also moved backward and the hook projection 216' is deviated from the guide groove 217 of the support piece 218, thereby permitting the locking lever 202 to swing in the vertical direction.

Also, the locker 212 is rotated round the axis 213 by the projection 210 formed with the locking lever 202 and the end of the locking lever 202 is free from the projection 214, thereby permitting the locking lever 202 to swing in the backward and forward direction.

Also, the guide projection 219 is moved from the guide hole 220 to the guide hole 221 having a diameter greater than that of the guide projection 219, thereby permitting the locking lever 202 to swing in the left and right directions.

In the above state, if the drive motor 110 is driven to further rotate the gear 113, the cam gear 201 is rotated under the unlocked state and the cam gear 301 is rotated under the clamped state. Also, the gear 501 of the pickup transfer portion is rotated by the gear part 320 of the cam gear 301.

Therefore, the rack 502 is moved by the rotation of the gear 501, and the pickup 109 is conveyed along the guide rod 504 by the movement of the rack 502 and simultaneously with transmission and reception of optical signals.

In this initial state of the pickup conveyance, the change gear 402 is rotated by the gear part 203 formed with the cam gear 201 of the locking portion and the rack 403 formed with the tray 108 is moved by the change gear 402, so that the tray 108 is inserted into the player.

That is, all operations are performed by the right and reverse rotation of the gear 113 over one revolution because the gear 113, the cam gear 201 and the cam gear 301 are mounted on the same axis 112.

Figure 10:
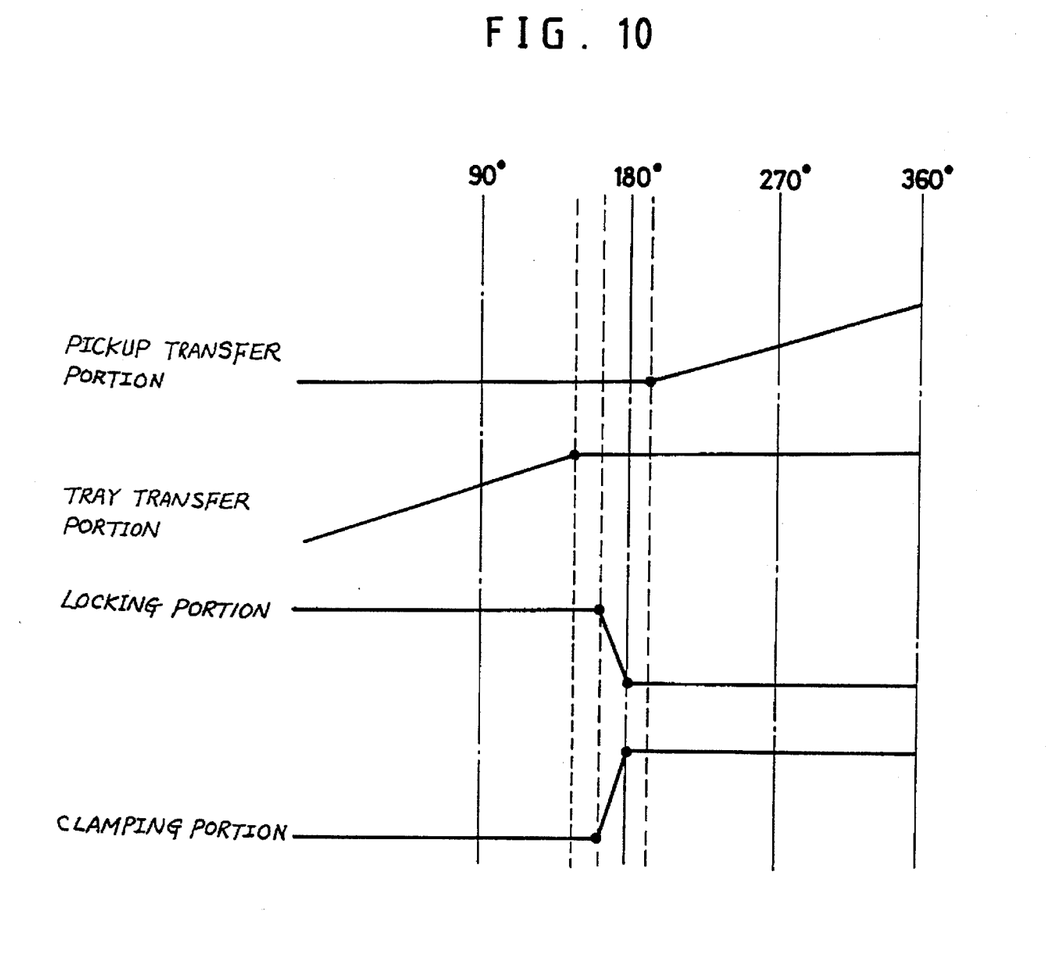
FIG. 10 is a diagram showing the relative operative states of each means.

FIG. 10 shows the operative relationship among the locking portion, the clamping portion, the tray transfer portion and the pickup transfer portion.

Once the gear 113 is rotated by the drive motor 110, the axis 112 on which the gear 113 is mounted is also rotated.

Accordingly, the cam gears 201 and 301 mounted on the same axis 112 are rotated together. The cam gear 201 is rotated while maintaining the locked state of the locking portion, and the tray 108 is inserted into the player by the actuation of the tray transfer portion engaged with the gear part 203 of the cam gear 201.

At this time, the cam gear 301 is rotated under the unclamped state of the clamping portion, and the pickup transfer portion is not driven because the non-gear part 321 of the cam gear 301 is positioned at the pickup transfer portion.

Then, if the gear part 203 of the cam gear 201 is rotated over an angle of 170°, the tray transfer portion stops its operation and the movement of the tray 108 is completed.

Subsequently, if the gear 113 is rotated any more, the locking portion is operated from the locked state and to the unlocked state and the clamping portion starts to be operated from the unclamped state to the clamped state. If the gear 113 is rotated over an angle of 180°, the locking portion falls into the unlocked state and the clamping portion falls into the clamped state.

Under the above conditions, if the gear 113 is rotated any more, the gear part 320 of the cam gear 301 starts to actuate the rack 403 to move the pickup 109.

As seen from the aforementioned description, the present invention can reduce the number of components and thus costs because various devices are driven by the single drive motor. Also, since the pickup base is formed separate from the main base and connected to the main base by the intermediate elastic members, poor reproduction of sound due to external impact can be eliminated. Also, the present invention can minimize the generation of backlash by driving the movement of the pickup using the rack. Moreover, the present invention does not require additional operating control systems because all operations are performed by the right and reverse rotation of the drive gear over one revolution, thereby shortening operation time.

The present invention is, of course, in no way restricted to the aforementioned specific disclosure of the specification and drawings, but also includes any equivalents such as modifications and variations within the scope of the appended claims.

What is claimed is:

1. A multi-compact disk player having a main base, a tray and an optical pickup, said player comprising:

a pickup base formed separate from a main base and providing damping of external impact or vibration when connected with said main base;

locking means locking said pickup base to prevent said pickup base from vibrating while a selected disk is inserted into said player;

clamping means for clamping said inserted disk under the locked state of said pickup base;

tray transfer means for inserting said tray into said player under the clamped state of said disk;

pickup transfer means for conveying said optical pickup towards said disk after said disk is inserted into said player; and a single drive motor for driving said locking means, said clamping means, said tray transfer means and said pickup transfer means by interlocking them with each other, said locking means comprising a rotating worm mounted on an axis of said drive motor, a gear being rotated in tooth with said worm, a cam gear mounted on an axis of said gear and able to be rotated synchronizingly with said gear, a locking lever for locking and unlocking said pickup base with its forward and backward movements caused by the rotation of said cam gear, locking lever transfer means for moving said locking lever forwardly and backwardly according to the rotation of said cam gear by being interlocked with said cam gear, horizontal vibro-isolating means for preventing said pickup base from vibrating horizontally due to mobility of said locking lever, and vertical vibro-isolating means for preventing said pickup base from vibrating vertically due to mobility of said locking lever, wherein said locking lever transfer means comprises a pin formed with said locking lever and a guide slot formed with said cam gear for inserting and guiding said pin to move said locking lever forward and backward, and wherein said guide slot includes three groove parts having different radii of curvature with each other, one for guiding the rotation of said cam gear while maintaining said locked state, another for releasing said locked state into said unlocked state and the other for guiding the rotation of said cam gear while maintaining said unlocked state.

* * * * *